United States Patent
Ohno

(10) Patent No.: US 11,642,875 B2
(45) Date of Patent: May 9, 2023

(54) HEAT-SHRINKABLE MULTILAYER FILM AND HEAT-SHRINKABLE LABEL

(71) Applicant: GUNZE LIMITED, Ayabe (JP)

(72) Inventor: Naoki Ohno, Shiga (JP)

(73) Assignee: GUNZE LIMITED, Kyoto (JP)

( * ) Notice: Subject to any disclaimer, the term of this patent is extended or adjusted under 35 U.S.C. 154(b) by 0 days.

(21) Appl. No.: 17/057,023

(22) PCT Filed: Jun. 10, 2019

(86) PCT No.: PCT/JP2019/022935
§ 371 (c)(1),
(2) Date: Nov. 19, 2020

(87) PCT Pub. No.: WO2020/008811
PCT Pub. Date: Jan. 9, 2020

(65) Prior Publication Data
US 2021/0206147 A1   Jul. 8, 2021

(30) Foreign Application Priority Data

Jul. 5, 2018 (JP) .............................. JP2018-128291

(51) Int. Cl.
| | | |
|---|---|---|
| B32B 27/08 | (2006.01) | |
| B32B 7/027 | (2019.01) | |
| B32B 7/12 | (2006.01) | |
| B32B 27/30 | (2006.01) | |
| B32B 27/36 | (2006.01) | |
| B65D 23/08 | (2006.01) | |
| G09F 3/02 | (2006.01) | |
| G09F 3/00 | (2006.01) | |

(52) U.S. Cl.
CPC .............. *B32B 27/08* (2013.01); *B32B 7/027* (2019.01); *B32B 7/12* (2013.01); *B32B 27/302* (2013.01); *B32B 27/36* (2013.01); *B65D 23/0842* (2013.01); *G09F 3/02* (2013.01); *G09F 3/0291* (2013.01); *B32B 2307/736* (2013.01); *B32B 2519/00* (2013.01); *G09F 2003/0257* (2013.01)

(58) Field of Classification Search
CPC ........... B32B 7/027; B32B 7/12; B32B 27/08; B32B 27/30; B32B 27/302; B32B 27/308; B32B 27/36; B32B 2250/03; B32B 2250/24; B32B 2250/40; B32B 2270/00; B32B 2307/30; B32B 2307/732; B32B 2307/736; B32B 2519/00; B32B 7/028; B65D 23/00; B65D 23/0842; G09F 3/02; G09F 3/0291; G09F 3/04; G09F 2003/0257

See application file for complete search history.

(56) References Cited

U.S. PATENT DOCUMENTS

| | | | |
|---|---|---|---|
| 2009/0202851 A1* | 8/2009 | Maruichi ................ | B32B 27/08 428/483 |
| 2009/0280341 A1* | 11/2009 | Maruichi ................ | B32B 27/28 428/483 |
| 2010/0055361 A1* | 3/2010 | Kawasaki ............. | B29C 55/005 428/34.9 |
| 2015/0064428 A1 | 3/2015 | Matsuo et al. | |
| 2016/0284248 A1* | 9/2016 | Banno ....................... | G09F 3/04 |
| 2017/0190158 A1 | 7/2017 | Ishikawa et al. | |
| 2018/0079877 A1 | 3/2018 | Ishimaru et al. | |
| 2020/0172725 A1* | 6/2020 | Tamari .................... | C08L 67/02 |

FOREIGN PATENT DOCUMENTS

| | | |
|---|---|---|
| CN | 104185547 | 12/2014 |
| CN | 106604817 | 4/2017 |
| EP | 2 657 016 | 10/2013 |
| JP | 61-41543 | 2/1986 |
| JP | 2000343604 A *| 12/2000 |
| JP | 2002-351332 | 12/2002 |
| JP | 2006-015745 | 1/2006 |
| JP | 2009-000898 | 1/2009 |
| JP | 2009-178887 | 8/2009 |
| JP | 2009241457 A *| 10/2009 |
| JP | 2011-170379 | 9/2011 |

OTHER PUBLICATIONS

Machine Translation of JP 2000-343604 via EPO (Year: 2000).*
Machine translation of JP 2009-241457 via EPO (Year: 2009).*

* cited by examiner

*Primary Examiner* — Laura C Powers
*Assistant Examiner* — Rebecca L Grusby
(74) *Attorney, Agent, or Firm* — Hamre, Schumann, Mueller & Larson, P.C.

(57) ABSTRACT

The present invention provides a heat shrinkable multilayer film that can prevent wrinkles or loosening after attachment when the film is attached to a container as a heat shrinkable label for dry heat shrinking, and a heat shrinkable label including the heat shrinkable multilayer film as a base film. Provided is a heat shrinkable multilayer film including: front and back layers each containing a polyester resin; and an interlayer containing a polystyrene resin, wherein the heat shrinkable multilayer film has a dimensional change in a TD represented by an equation (1) of −55 to −1000 μm as measured by thermomechanical analysis (TMA) in which the temperature of the heat shrinkable multilayer film under a load of 0.10 N is increased from 30° C. to 60° C. at a temperature increase rate of 5° C./min and then cooled from 60° C. to 10° C. at a temperature decrease rate of 5° C./min, the equation (1) being: Dimensional change=dimension in TD at 20° C. −dimension in TD at 60° C. (1).

4 Claims, No Drawings

HEAT-SHRINKABLE MULTILAYER FILM AND HEAT-SHRINKABLE LABEL

TECHNICAL FIELD

The present invention relates to a heat shrinkable multilayer film that can prevent wrinkles or loosening after attachment when the film is attached to a container as a heat shrinkable label for dry heat shrinking, and a heat shrinkable label including the heat shrinkable multilayer film as a base film.

BACKGROUND ART

Many recent containers such as plastic bottles and metal cans have heat shrinkable labels that are produced by printing images and the like on a base film made of a heat shrinkable resin.

Wet heat shrinking and dry heat shrinking are two widely used methods for attaching a heat shrinkable label to a container by heating.

Wet heat shrinking is a method for attaching a heat shrinkable label to a container by shrinking the label by heating using water vapor. Water vapor, which has high thermal conductivity, can give sufficient heat to the heat shrinkable resin film in a short time, thus significantly increasing the label attaching rate. Additionally, wet heat shrinking is less likely to cause uneven heating in the atmosphere, allowing the attached label to have excellent shrink finish quality with less distortion of printed images and fewer wrinkles.

Dry heat shrinking is a method for attaching a heat shrinkable label to a container by shrinking the label by heating using hot air. Because of no use of water vapor, dry heat shrinking is more hygienic than wet heat shrinking. Dry heat shrinking also has an advantage that it requires simpler equipment for shrinking and attaching a label than wet heat shrinking. Dry heat shrinking is thus usually used to attach heat shrinkable labels to containers in small lots or attaching heat shrinkable labels to containers before being filled with the contents.

Heat shrinkable labels attached by dry heat shrinking are mainly those containing polystyrene resins, because polystyrene resins have excellent low-temperature shrinkability. However, polystyrene resin films, having low rigidity, have poor compatibility with machines, and thus are likely to cause trouble such as label clogging. Polystyrene resin films also have insufficient solvent resistance, and thus may shrink or dissolve due to adherence of oil when used to package oil-containing products.

Instead of polystyrene resin films, polyester films, which have excellent heat resistance and solvent resistance, have also been used as heat shrinkable labels. However, polyester films have poor low-temperature shrinkability and rapidly shrink, which is likely to cause distortion of printed images or wrinkles when the label is attached to a container.

Patent Literature 1 discloses a hard multilayer shrinkable film including an interlayer containing a polystyrene resin, outer surface layers containing a polyester resin, the outer surface layers being stacked on the interlayer with adhesive layers containing an olefin resin therebetween. Patent Literature 2 discloses a heat shrink label including a base film. The base film includes an interlayer containing a polystyrene resin and outer surface layers containing a polyester resin made of a specific monomer, the outer surface layers being stacked on both surfaces of the interlayer with no adhesive layer therebetween. Patent Literature 3 discloses a laminated film including surface layers containing a polyester resin, an interlayer containing a styrene resin, and adhesive layers containing an adhesive resin.

When used for dry heat shrinking, these heat shrinkable labels have excellent finish quality immediately after attachment. However, immediately after label attachment, the container itself is expanded, and contracts as it cools. Such expansion and contraction may form a gap between the label and the container.

Containers for toiletry particularly have irregular shapes with high design quality for sales promotion or product differentiation. It is difficult to give desired shrink finish to these irregularly shaped containers, and thus such containers are exposed to hot air for a longer time than common cylindrical containers. Such longer exposure increases expansion and contraction of the container, forming a large gap between the container and the label. As a result, the label may loosen or wrinkle, causing appearance defects.

CITATION LIST

Patent Literature

Patent Literature 1: JP S61-41543 A
Patent Literature 2: JP 2002-351332 A
Patent Literature 3: JP 2006-15745 A

SUMMARY OF INVENTION

Technical Problem

The present invention aims to provide a heat shrinkable multilayer film that can prevent wrinkles or loosening after attachment when the film is attached to a container as a heat shrinkable label for dry heat shrinking, and a heat shrinkable label including the heat shrinkable multilayer film as a base film.

Solution to Problem

The present invention relates to a heat shrinkable multilayer film including: front and back layers each containing a polyester resin; and an interlayer containing a polystyrene resin, wherein the heat shrinkable multilayer film has a dimensional change in a TD represented by an equation (1) of −55 to −1000 μm as measured by thermomechanical analysis (TMA) in which the temperature of the heat shrinkable multilayer film under a load of 0.10 N is increased from 30° C. to 60° C. at a temperature increase rate of 5° C./min and then cooled from 60° C. to 10° C. at a temperature decrease rate of 5° C./min, the equation (1) being: Dimensional change=dimension in TD at 20° C.−dimension in TD at 60° C. (1).

The present invention is described in detail below.

The present inventors arrived at a heat shrinkable multilayer film that includes front and back layers each containing a polyester resin and an interlayer containing a polystyrene resin and has a dimensional change within a specific range as measured by thermomechanical analysis (TMA). The inventors found out that especially when attached to a container as a heat shrinkable label for dry heat shrinking, the heat shrinkable multilayer film can prevent wrinkles and loosening after attachment and provide a labelled container having excellent aesthetic appearance. The inventors thus completed the present invention.

The heat shrinkable multilayer film of the present invention includes front and back layers and an interlayer.

The "front and back layers" as used herein means both the front layer and the back layer. The heat shrinkable multilayer film of the present invention has a structure in which the interlayer is interposed between the front layer and the back layer.

(Front and Back Layers)

The front and back layers each contain a polyester resin.

Examples of the polyester resin include those obtainable by polycondensation of a dicarboxylic acid component and a diol component. Particularly preferred are aromatic polyester resins containing 55 mol % or more of terephthalic acid in 100 mol % of the dicarboxylic acid components. The aromatic polyester resins may contain, in addition to terephthalic acid, any of o-phthalic acid, isophthalic acid, succinic acid, adipic acid, sebacic acid, azelaic acid, octylsuccinic acid, cyclohexane dicarboxylic acid, naphthalene dicarboxylic acid, fumaric acid, maleic acid, itaconic acid, decamethylene carboxylic acid, anhydrides thereof, and lower alkyl esters thereof, as the dicarboxylic acid component.

The diol component is not limited. Examples thereof include aliphatic diols such as ethylene glycol, 1,3-propanediol, 1,4-butanediol, diethylene glycol, 1,5-pentanediol, 1,6-hexanediol, dipropylene glycol, triethylene glycol, tetraethylene glycol, 1,2-propanediol, 1,3-butanediol, 2,3-butanediol, neopentyl glycol (2,2-dimethylpropane-1,3-diol), 1,2-hexanediol, 2,5-hexanediol, 2-methyl-2,4-pentanediol, 3-methyl-1,3-pentanediol, 2-ethyl-1,3-hexanediol, and polytetramethylene ether glycol; and alicyclic diols such as 2,2-bis(4-hydroxycyclohexyl)propane, adducts of alkylene oxide with 2,2-bis(4-hydroxycyclohexyl)propane, 1,4-cyclohexanediol, and 1,4-cyclohexanedimethanol.

Preferred among the polyester resins are those containing a component derived from terephthalic acid as a dicarboxylic acid component and a component derived from ethylene glycol and/or 1,4-cyclohexanedimethanol as a diol component. By using such an aromatic polyester random copolymer resin, excellent heat shrinkability can be provided to the heat shrinkable film.

For higher heat shrinkability, in 100 mol % of the diol components, the amount of a component derived from ethylene glycol is preferably 60 to 80 mol % and the amount of a component derived from 1,4-cyclohexanedimethanol is preferably 10 to 40 mol %.

Such an aromatic polyester random copolymer resin may optionally further contain a component derived from diethylene glycol in an amount of 0 to 30 mol %, preferably 1 to 25 mol %, more preferably 2 to 20 mol %. Use of diethylene glycol increases tensile elongation at break in the main shrinkage direction of the heat shrinkable film, which can prevent the inner side of the film from remaining alone on the container due to delamination in tearing the film along the perforation. When the amount of the component derived from diethylene glycol is 30 mol % or less, the low-temperature shrinkability of the heat shrinkable film can be reduced, and thus wrinkling can be prevented when the film is attached to a container.

The polyester resin containing a component derived from terephthalic acid as a dicarboxylic acid component may contain a component derived from 1,4-butanediol as a diol component. Such a polyester resin is generally referred to as polybutylene terephthalate resin.

The polybutylene terephthalate resin is preferably used in combination with the above aromatic polyester random copolymer resin containing a component derived from terephthalic acid as a dicarboxylic acid component and a component derived from ethylene glycol and 1,4-cyclohexanedimethanol as a diol component. Use of such a mixed resin provides better finish quality.

The polybutylene terephthalate resin may be a polybutylene terephthalate resin consisting only of a component derived from terephthalic acid and a component derived from 1,4-butanediol, or may be a polybutylene terephthalate resin containing a dicarboxylic acid component other than a component derived from terephthalic acid and/or a diol component other than a component derived from 1,4-butanediol.

The amount of the dicarboxylic acid component other than a component derived from terephthalic acid is preferably 10 mol % or less in 100 mol % of the dicarboxylic acid components. When the amount is 10 mol % or less, the polybutylene terephthalate resin can exhibit improved heat resistance. The amount of the diol component other than a component derived from 1,4-butanediol is preferably 10 mol % or less in 100 mol % of the diol components. When the amount is 10 mol % or less, the polybutylene terephthalate resin can exhibit further improved heat resistance.

The amount of the polybutylene terephthalate resin added is not limited, but is preferably 30% by weight or less. Adding the polybutylene terephthalate resin in an amount of 30% by weight or less can reduce natural shrinkage and thus prevent a reduction in film rigidity.

The lower limit of the Vicat softening temperature of the polyester resin constituting the front and back layers is preferably 55° C., and the upper limit thereof is preferably 95° C. A polyester resin having a Vicat softening temperature of lower than 55° C. may cause the heat shrinkable multilayer film to have too low a shrinkage starting temperature, or to have a greater natural shrinkage ratio. A polyester resin having a Vicat softening temperature of higher than 95° C. may reduce the low-temperature shrinkability and shrink finish quality of the heat shrinkable multilayer film, or may cause a greater time-related decrease in low-temperature shrinkability. The lower limit of the Vicat softening temperature is more preferably 60° C. and the upper limit thereof is more preferably 90° C.

The Vicat softening temperature can be measured by a method in conformity with ISO 306.

The lower limit of the glass transition temperature of the polyester resin constituting the front and back layers is preferably 55° C. and the upper limit thereof is preferably 95° C. The polyester resin having a glass transition temperature of 55° C. or higher can sufficiently increase the shrinkage starting temperature of the heat shrinkable film, and thus can reduce natural shrinkage. The polyester resin having a glass transition temperature of 95° C. or lower can improve the low-temperature shrinkability and shrink finish quality of the heat shrinkable film, and also can reduce a time-related decrease in low-temperature shrinkability. The lower limit of the glass transition temperature is more preferably 60° C. and the upper limit thereof is more preferably 90° C.

The glass transition temperature can be measured with a differential scanning calorimeter (DSC).

The lower limit of the tensile modulus of the polyester resin constituting the front and back layers is preferably 1000 MPa and the upper limit thereof is preferably 4000 MPa. The polyester resin having a tensile modulus of 1000 MPa or more can sufficiently increase the shrinkage starting temperature of the heat shrinkable film and thus can reduce natural shrinkage. The polyester resin having a tensile modulus of 4000 MPa or less can improve the low-temperature shrinkability and shrink finish quality of the heat shrinkable film, and also can reduce a time-related decrease in low-temperature shrinkability. The lower limit of the tensile modulus is more preferably 1500 MPa and the upper limit thereof is more preferably 3700 MPa.

The tensile modulus can be measured by a method in conformity with ASTM-D882 (Test A).

Examples of commercially available polyester resins for use in the front and back layers include "Easter", "Embrace LV" (both produced by Eastman Chemical Company), "BELLPET" (produced by Bell Polyester Products, Inc.), and "NOVADURAN" (produced by Mitsubishi Engineering-Plastics Corporation).

The front and back layers may contain one polyester resin having the above-described composition alone, or may contain two or more polyester resins having the above composition in combination. The front and back layers may contain polyester resins having different compositions, but preferably contain polyester resins having the same composition to prevent trouble such as curling of the film.

The front and back layers may optionally contain additives such as antioxidants, heat stabilizers, ultraviolet absorbers, light stabilizers, lubricants, antistatic agents, antiblocking agents, flame retardants, antimicrobials, fluorescent whitening agents, and colorants.

(Interlayer)

The heat shrinkable multilayer film of the present invention includes the interlayer.

The interlayer contains a polystyrene resin.

Examples of the polystyrene resin include aromatic vinyl hydrocarbon-conjugated diene copolymers, mixed resins of an aromatic vinyl hydrocarbon-conjugated diene copolymer and an aromatic vinyl hydrocarbon-unsaturated aliphatic carboxylate copolymer, and rubber-modified high impact polystyrenes. The polystyrene resin allows the heat shrinkable multilayer film of the present invention to start shrinking at low temperature and to have high shrinkability.

The "aromatic vinyl hydrocarbon-conjugated diene copolymer" as used herein means a copolymer containing a component derived from an aromatic vinyl hydrocarbon and a component derived from a conjugated diene.

The aromatic vinyl hydrocarbon is not limited. Examples thereof include styrene, o-methylstyrene, and p-methylstyrene. These may be used alone or in combination of two or more thereof. The conjugated diene is not limited. Examples thereof include 1,3-butadiene, 2-methyl-1,3-butadiene, 2,3-dimethyl-1,3-butadiene, 1,3-pentadiene, and 1,3-hexadiene. These may be used alone or in combination of two or more thereof.

The aromatic vinyl hydrocarbon-conjugated diene copolymer preferably contains a styrene-butadiene copolymer (SBS resin) for particularly excellent heat shrinkability. To produce a heat shrinkable multilayer film with less fish eyes, the aromatic vinyl hydrocarbon-conjugated diene copolymer preferably contains an aromatic vinyl hydrocarbon-conjugated diene copolymer containing 2-methyl-1,3-butadiene (isoprene) as the conjugated diene, such as a styrene-isoprene copolymer (SIS resin) or a styrene-isoprene-butadiene copolymer (SIBS resin).

The aromatic vinyl hydrocarbon-conjugated diene copolymer may contain any one of the SBS resin, SIS resin, and SIBS resin alone, or may contain more than one of them in combination. In the case of using more than one of the SBS resin, SIS resin, and SIBS resin, the resins may be dry-blended with each other, or the resins may be kneadpelletized at a specific composition through an extruder and the obtained compound resin may be used.

An aromatic vinyl hydrocarbon-conjugated diene copolymer containing one or more of the SBS resin, SIS resin, and SIBS resin preferably has a styrene content of 65 to 90% by weight and a conjugated diene content of 10 to 35% by weight in 100% by weight of the aromatic vinyl hydrocarbon-conjugated diene copolymer so as to provide a heat shrinkable multilayer film having particularly excellent heat shrinkability. A styrene content of more than 90% by weight or a conjugated diene content of less than 10% by weight may cause the heat shrinkable multilayer film to be easily torn under tension or to unexpectedly break during processing such as printing. A styrene content of less than 65% by weight or a conjugated diene content of more than 35% by weight may cause formation of impurities such as gel during molding or may cause the heat shrinkable multilayer film to have poor strength, likely resulting in poor handleability.

The "aromatic vinyl hydrocarbon-unsaturated aliphatic carboxylate copolymer" herein means a copolymer containing a component derived from an aromatic vinyl hydrocarbon and a component derived from an unsaturated aliphatic carboxylate.

The aromatic vinyl hydrocarbon is not limited, and may be the same aromatic vinyl hydrocarbon as that used for the aromatic vinyl hydrocarbon-conjugated diene copolymer. The unsaturated aliphatic carboxylate is not limited. Examples thereof include methyl (meth)acrylate, butyl (meth) acrylate, 2-ethylhexyl (meth) acrylate, lauryl (meth) acrylate, and stearyl (meth)acrylate. The "(meth)acrylate" includes both acrylate and methacrylate.

When the aromatic vinyl hydrocarbon-unsaturated aliphatic carboxylate copolymer is a styrene-butyl acrylate copolymer, the styrene-butyl acrylate copolymer preferably has a styrene content of 60 to 90% by weight and a butyl acrylate content of 10 to 40% by weight in 100% by weight of the styrene-butyl acrylate copolymer. An aromatic vinyl hydrocarbon-unsaturated aliphatic carboxylate copolymer with such a composition allows the heat shrinkable multilayer film to have excellent heat shrinkability.

There is no limitation on the mixed resin of the aromatic vinyl hydrocarbon-conjugated diene copolymer and the aromatic vinyl hydrocarbon-unsaturated aliphatic carboxylate copolymer. The mixed resin preferably contains the aromatic vinyl hydrocarbon-unsaturated aliphatic carboxylate copolymer in an amount of 80% by weight or less.

The rubber-modified high impact polystyrene mainly contains a continuous phase of a styrene-alkyl methacrylate-alkyl acrylate terpolymer and a dispersed phase of a conjugated-diene-based rubber component.

Examples of the alkyl methacrylate forming the continuous phase include methyl methacrylate and ethyl methacrylate. Examples of the alkyl acrylate include methyl acrylate, ethyl acrylate, propyl acrylate, and butyl acrylate.

The proportion of the styrene in the terpolymer forming the continuous phase is preferably 20 to 80% by weight, more preferably 30 to 70% by weight. The proportion of the alkyl methacrylate is preferably 10 to 50% by weight, more preferably 15 to 40% by weight. The proportion of the alkyl acrylate is preferably 1 to 30% by weight, more preferably 5 to 20% by weight.

The conjugated-diene-based rubber component forming the dispersed phase is preferably a polybutadiene or a styrene-butadiene copolymer having a styrene content of 5 to 30% by weight.

The conjugated-diene-based rubber component forming the dispersed phase preferably has a particle size of 0.1 to 1.2 μm, more preferably 0.3 to 0.8 μm. A conjugated-diene-based rubber component having a particle size of smaller than 0.1 μm may lead to insufficient impact resistance of the rubber-modified high impact polystyrene. A conjugated-diene-based rubber component having a particle size of greater than 1.2 μm may reduce the transparency of the interlayer.

In the rubber-modified high impact polystyrene, the proportion of the continuous phase composed of the styrene-alkyl methacrylate-alkyl acrylate terpolymer is preferably 70 to 95% by weight, and the proportion of the dispersed phase composed of the conjugated-diene-based rubber component is preferably 5 to 20% by weight. A dispersed phase in a proportion of less than 5% by weight may lead to insufficient impact resistance of the rubber-modified high impact polystyrene. A dispersed phase in a proportion of more than 20% by weight may reduce the transparency of the interlayer.

The lower limit of the Vicat softening temperature of the polystyrene resin is preferably 50° C. and the upper limit thereof is preferably 90° C. The polystyrene resin having a Vicat softening temperature of 50° C. or higher allows the heat shrinkable multilayer film to have good low-temperature shrinkability, thus reducing wrinkles when the film is attached to a container. The polystyrene resin having a Vicat softening temperature of 90° C. or lower can sufficiently increase the low-temperature shrinkability of the heat shrinkable multilayer film, thus preventing the film from remaining partly unshrunk when the film is attached to a container. The lower limit of the Vicat softening temperature is more preferably 55° C. and the upper limit thereof is more preferably 85° C. The Vicat softening temperature can be measured by a method in conformity with ISO 306.

The lower limit of the melt flow rate (MFR) at 200° C. of the polystyrene resin is preferably 2 g/10 min and the upper limit thereof is preferably 15 g/10 min. The polystyrene resin having a MFR at 200° C. of 2 g/10 min or higher can improve the film formability. The polystyrene resin having a MFR at 200° C. of 15 g/10 min or lower can sufficiently improve the mechanical strength of the film. The lower limit of the MFR at 200° C. is more preferably 4 g/10 min and the upper limit thereof is more preferably 12 g/10 min. The MFR may be determined by a method in conformity with ISO 1133.

Examples of commercially available polystyrene resins for use in the interlayer include "CLEAREN" (produced by Denki Kagaku Kogyo Kabushiki Kaisha), "Asaflex" (produced by Asahi Kasei Chemicals Corporation), "Styrolux" (produced by BASF SE), and "PSJ-polystyrene" (produced by PS Japan Corporation).

The interlayer may contain a styrene elastomer.

Examples of the styrene elastomer include resins composed of polystyrene as a hard segment and polybutadiene, polyisoprene, or a copolymer of polybutadiene and polyisoprene as a soft segment; and hydrogenated products thereof. In the hydrogenated products, polybutadiene, polyisoprene, and the like may be partially or entirely hydrogenated.

Examples of commercially available styrene elastomers include "Tuftec" and "Tufprene" (both produced by Asahi Kasei Chemicals Corporation), "Kraton" (produced by Kraton Polymers Japan Ltd), "DYNARON" (produced by JSR Corporation), and "SEPTON" (produced by Kuraray Co., Ltd.).

Examples of a modified product of the styrene elastomer include those modified with a functional group such as a carboxylic acid group, an acid anhydride group, an amino group, an epoxy group, or a hydroxy group.

In the modified product of the styrene elastomer, the lower limit of the amount of the functional group is preferably 0.05% by weight and the upper limit thereof is preferably 5.0% by weight. When the amount of the functional group is less than 0.05% by weight, the interlaminar strength of the heat shrinkable multilayer film may be reduced. When the amount of the functional group is more than 5.0% by weight, the styrene elastomer may thermally degrade during the addition of the functional group, and thus impurities such as gel may be easily formed. The lower limit of the amount of the functional group is more preferably 0.1% by weight and the upper limit thereof is more preferably 3.0% by weight.

The lower limit of the Vicat softening temperature of the styrene elastomer is preferably 65° C., more preferably 70° C. The upper limit thereof is preferably 85° C., more preferably 80° C.

The Vicat softening temperature can be measured by a method in conformity with ISO 306.

The upper limit of the amount of the styrene elastomer in the interlayer is preferably 15% by weight, more preferably 10% by weight.

The lower limit of the amount of the styrene elastomer is not limited. The lower limit is preferably 0% by weight, more preferably 1.0% by weight, still more preferably 1.5% by weight.

The interlayer preferably contains a polystyrene resin (A) having a Vicat softening temperature of 80° C. or higher in an amount of 0 to 60% by weight.

The interlayer containing a predetermined amount of the polystyrene resin (A) having a Vicat softening temperature of 80° C. or higher can further improve the loosening prevention effect in dry heat shrinking.

The lower limit of the amount of the polystyrene resin (A) in the interlayer is more preferably 10% by weight, still more preferably 20% by weight, and the upper limit thereof is more preferably 50% by weight.

The upper limit of the Vicat softening temperature of the polystyrene resin (A) is preferably 90° C., more preferably 85° C.

The interlayer preferably contains a polystyrene resin (B) having a Vicat softening temperature of lower than 80° C. in an amount of 40 to 100% by weight.

The interlayer containing a predetermined amount of the polystyrene resin (B) having a Vicat softening temperature of lower than 80° C. can further improve the loosening prevention effect in dry heat shrinking.

The lower limit of the amount of the polystyrene resin (B) in the interlayer is more preferably 50% by weight, and the upper limit thereof is more preferably 90% by weight, still more preferably 80% by weight.

The lower limit of the Vicat softening temperature of the polystyrene resin (B) is preferably 50° C., more preferably 55° C.

In the interlayer, the lower limit of the ratio of the amount of the polystyrene resin (A) having a Vicat softening temperature of 80° C. or higher to the amount of the polystyrene resin (B) having a Vicat softening temperature of lower than 80° C. (amount of polystyrene resin (A)/amount of polystyrene resin (B)) is preferably 0/100, more preferably 10/90, still more preferably 20/80, and the upper limit thereof is preferably 60/40, more preferably 50/50.

The polystyrene resin (A) and the polystyrene resin (B) preferably have a difference in Vicat softening temperature of 5° C. or more, more preferably 10° C. or more, and preferably 25° C. or less, more preferably 20° C. or less.

When the interlayer contains a mixed resin containing the polystyrene resin (A) having a Vicat softening temperature of 80° C. or higher and the polystyrene resin (B) having a Vicat softening temperature of lower than 80° C., the lower limit of the apparent Vicat softening temperature of the mixed resin is preferably 65° C., more preferably 68° C., and the upper limit thereof is preferably 78° C., more preferably 77° C.

The Vicat softening temperature can be measured by a method in conformity with ISO 306.

The interlayer may contain additives such as antioxidants, thermal stabilizers, ultraviolet absorbers, light stabilizers, lubricants, antistatic agents, anti-blocking agents, flame retardants, antibacterial agents, fluorescent brighteners, and colorants, if necessary.

(Adhesive Layer)

When higher interlaminar adhesive strength between the front and back layers and the interlayer is desired, the front and back layers and the interlayer in the heat shrinkable multilayer film of the present invention are preferably stacked with adhesive layers interposed therebetween.

The adhesive resin constituting the adhesive layers may be any commonly commercially available adhesive resin. For example, the adhesive resin is preferably a styrene elastomer, a polyester elastomer, a modified product of the styrene elastomer or the polyester elastomer, a mixed resin of a polyester resin and a polystyrene resin (herein, also referred to as a mixed resin (a)), a mixed resin of a polystyrene resin and a polyester elastomer (herein, also referred to as a mixed resin (b)). Such adhesive layers have high compatibility with both of the polyester resin constituting the front and back layers and the polystyrene resin constituting the interlayer, and thus can bond these layers with high adhesive strength. The resin constituting the adhesive layers is dissolved or swollen in the solvent that dissolves the polyester resin constituting the front and back layers. The solvent thus can penetrate to the inside of the heat shrinkable multilayer film in center sealing, preventing delamination in the subsequent heat shrinking. Furthermore, the adhesive layers can be formed by a co-extrusion method together with the interlayer and the front and back layers, leading to excellent production efficiency.

Examples of the styrene elastomer include resins composed of polystyrene as a hard segment and polybutadiene, polyisoprene, or a copolymer of polybutadiene and polyisoprene as a soft segment; and hydrogenated products thereof. In the hydrogenated products, polybutadiene, polyisoprene, and the like may be partially or entirely hydrogenated.

Examples of commercially available styrene elastomers include "Tuftec" and "Tufprene" (both produced by Asahi Kasei Chemicals Corporation), "Kraton" (produced by Kraton Polymers Japan Ltd.), "DYNARON" (produced by JSR Corporation), and "SEPTON" (produced by Kuraray Co., Ltd.).

Examples of a modified product of the styrene elastomer include those modified with a functional group such as a carboxylic acid group, an acid anhydride group, an amino group, an epoxy group, or a hydroxy group.

In the modified product of the styrene elastomer, the lower limit of the amount of the functional group is preferably 0.05% by weight and the upper limit thereof is preferably 5.0% by weight. When the amount of the functional group is less than 0.05% by weight, the interlaminar strength of the heat shrinkable multilayer film may be reduced. When the amount of the functional group is more than 5.0% by weight, the addition of the functional group may thermally degrade the styrene elastomer, and thus impurities such as gel may be easily formed. The lower limit of the amount of the functional group is more preferably 0.1% by weight and the upper limit thereof is more preferably 3.0% by weight.

The polyester elastomer is preferably a saturated polyester elastomer, particularly preferably a saturated polyester elastomer containing a polyalkylene ether glycol segment.

The saturated polyester elastomer containing a polyalkylene ether glycol segment is preferably, for example, a block copolymer containing an aromatic polyester as a hard segment and a polyalkylene ether glycol or an aliphatic polyester as a soft segment, more preferably a polyester polyether block copolymer containing a polyalkylene ether glycol as a soft segment.

The polyester polyether block copolymer is preferably one obtained by preparing an oligomer by esterification reaction or transesterification reaction using the following materials: (i) a C2-C12 aliphatic and/or alicyclic diol; (ii) an aromatic dicarboxylic acid and/or aliphatic dicarboxylic acid or an alkyl ester thereof; and (iii) a polyalkylene ether glycol, and then performing polycondensation of the resulting oligomer.

Examples of the C2-C12 aliphatic and/or alicyclic diol and the aromatic dicarboxylic acid and/or aliphatic dicarboxylic acid or alkyl ester thereof include those commonly used as raw materials of polyesters, especially raw materials of polyester elastomers.

Examples of the polyalkylene ether glycol include polyethylene glycol, poly(1,2- and/or 1,3-propylene ether)glycol, poly(tetramethylene ether)glycol, and poly(hexamethylene ether)glycol.

The lower limit of the number average molecular weight of the polyalkylene ether glycol is preferably 400 and the upper limit thereof is preferably 6000. The polyalkylene ether glycol having a number average molecular weight of 400 or more allows the copolymer to have high blocking properties. The polyalkylene ether glycol having a number average molecular weight of 6000 or less is less likely to cause phase separation in the system, so that polymer physical properties can be easily exhibited. The lower limit of the number average molecular weight is more preferably 500 and the upper limit thereof is more preferably 3000. The lower limit is still more preferably 600.

The number average molecular weight is measured by gel permeation chromatography (GPC). The calibration for GPC can be performed using POLYTETRAHYDROFURAN Calibration Kit (produced by Polymer Laboratories, UK), for example.

In the polyester polyether block copolymer, the lower limit of the amount of the polyalkylene ether glycol component is preferably 5% by weight and the upper limit thereof is preferably 90% by weight. When the amount of the polyalkylene ether glycol component is 5% by weight or more, the block copolymer has excellent flexibility and excellent impact resistance. When the amount of the polyalkylene ether glycol component is 90% by weight or less, the block copolymer has excellent hardness and excellent mechanical strength. The lower limit of the amount of the polyalkylene ether glycol component is more preferably 30% by weight and the upper limit thereof is more preferably 80% by weight. The lower limit is still more preferably 55% by weight.

The amount of the polyalkylene ether glycol component can be calculated based on the chemical shifts and amount of hydrogen atoms by nuclear magnetic resonance spectroscopy (NMR).

The lower limit of the durometer hardness of the polyester elastomer is preferably 10 and the upper limit thereof is preferably 80. The polyester elastomer having a durometer hardness of 10 or more improves the mechanical strength of the adhesive layers. The polyester elastomer having a durometer hardness of 80 or less can improve the flexibility and impact resistance of the adhesive layers. The lower limit of the durometer hardness is more preferably 15 and the upper limit thereof is more preferably 70. The lower limit is still more preferably 20 and the upper limit is still more preferably 60.

The durometer hardness can be determined by a method in conformity with ISO 18517 using a durometer (type D).

Examples of commercially available polyester elastomers include "PRIMALLOY" (produced by Mitsubishi Chemical Corporation), "PELPRENE" (produced by Toyobo Co., Ltd.), and "Hytrel" (produced by Du Pont-Toray Co., Ltd.).

The modified product of the polyester elastomer (hereinafter also referred to as a modified polyester elastomer) is obtained by modifying the above polyester elastomer with a modifier.

For example, the modification reaction to obtain the modified polyester elastomer may be performed by reacting the polyester elastomer with α,β-ethylenically unsaturated carboxylic acid as a modifier. The modification reaction is preferably performed using a radical generator.

The modification reaction mainly involves graft reaction in which the α,β-ethylenically unsaturated carboxylic acid or a derivative thereof is added to the polyester elastomer, but also involves decomposition reaction. As a result, the modified polyester elastomer has a reduced molecular weight and thus has a reduced melt viscosity.

The modification reaction is considered to typically involve other reactions such as transesterification reaction. The resulting reaction product is usually a composition containing unreacted raw material and the like. In this case, the lower limit of the amount of the modified polyester elastomer in the resulting reaction product is preferably 10% by weight, more preferably 30% by weight. The closer the amount of the modified polyester elastomer to 100% by weight, the better.

The lower limit of the modification ratio (graft content) of the modified polyester elastomer is preferably 0.01% by weight and the upper limit thereof is preferably 10.0% by weight. A modification ratio of 0.01% by weight or more allows the modified polyester elastomer to have high compatibility with polyesters. A modification ratio of 10.0% by weight or less can lead to less strength reduction due to molecular degradation during modification. The lower limit of the modification ratio is more preferably 0.03% by weight and the upper limit thereof is more preferably 7.0% by weight. The lower limit is still more preferably 0.05% by weight and the upper limit is still more preferably 5.0% by weight.

The modification ratio (graft content) of the modified polyester elastomer can be determined according to the following equation (2) from a spectrum obtained by H1-NMR analysis. The H1-NMR analysis may be performed using a device such as "GSX-400" (produced by JEOL Ltd.).

$$\text{Graft content (\% by weight)} = 100 \times \times [(C/3 \times 98)/\{(A \times 148/4) + (B \times 72/4) + (C/3 \times 98)\}] \quad (2)$$

In the equation (2), A is an integral value at 7.8 to 8.4 ppm, B is an integral value at 1.2 to 2.2 ppm, and C is an integral value at 2.4 to 2.9 ppm.

The polyester resin constituting the mixed resin of a polyester resin and a polystyrene resin (herein, also referred to as a mixed resin (a)) may be the same as or different from the above polyester resin constituting the front and back layers. The polyester resin particularly preferably contains a component derived from terephthalic acid as a dicarboxylic acid component and a component derived from ethylene glycol and/or 1,4-cyclohexanedimethanol as a diol component. Such a polyester resin may optionally further contain a component derived from diethylene glycol in an amount of 0 to 30 mol %, preferably 1 to 25 mol %, more preferably 2 to 20 mol %.

When the polyester resin used is a polybutylene terephthalate resin, the polybutylene terephthalate resin may be a polybutylene terephthalate resin consisting only of a component derived from terephthalic acid and a component derived from 1,4-butanediol, or may be a polybutylene terephthalate resin containing a dicarboxylic acid component other than a component derived from terephthalic acid and/or a diol component other than a component derived from 1,4-butanediol.

The amount of the dicarboxylic acid component other than a component derived from terephthalic acid is preferably 50 mol % or less in 100 mol % of the dicarboxylic acid components. When the amount is 50 mol % or less, the polybutylene terephthalate resin can maintain heat resistance. The amount of the diol component other than a component derived from 1,4-butanediol is preferably 50 mol % or less in 100 mol % of the diol components.

In the mixed resin (a), the lower limit of the amount of the polyester resin is preferably 5% by weight and the upper limit thereof is preferably 90% by weight. When the amount of the polyester resin is less than 5% by weight, delamination of the heat shrinkable multilayer film may occur when the overlapping portion is scratched after attaching the film to a container or when the film is torn along the perforation. When the amount of the polyester resin is more than 90% by weight, the interlaminar strength of the heat shrinkable multilayer film may be reduced. In addition, delamination of the heat shrinkable multilayer film may occur when the overlapping portion is scratched after attaching the film to a container or when the film is torn along the perforation. The lower limit of the amount of the polyester resin is more preferably 10% by weight, still more preferably 25% by weight, and the upper limit thereof is more preferably 80% by weight, still more preferably 75% by weight.

The polystyrene resin constituting the mixed resin (a) may be the same as or different from the above polyester resin constituting the interlayer.

When the polystyrene resin constituting the mixed resin (a) is a styrene-conjugated diene copolymer, the conjugated diene content in 100% by weight of the styrene-conjugated diene copolymer is preferably less than 50% by weight. When the conjugated diene content is 50% by weight or more, delamination of the heat shrinkable multilayer film may occur when the overlapping portion is scratched after attaching the film to a container or when the film is torn along the perforation.

In the mixed resin (a), the lower limit of the amount of the polystyrene resin is preferably 10% by weight and the upper limit thereof is preferably 95% by weight. When the amount of the polystyrene resin is less than 10% by weight, the interlaminar strength of the heat shrinkable multilayer film may be reduced. In addition, delamination of the heat shrinkable multilayer film may occur when the overlapping portion is scratched after attaching the film to a container or when the film is torn along the perforation. When the amount of the polystyrene resin is more than 95% by weight, delamination of the heat shrinkable multilayer film may occur when the overlapping portion is scratched after attaching the film to a container or when the film is torn along the perforation. The lower limit of the amount of the polystyrene resin is more preferably 20% by weight, still more preferably 25% by weight and the upper limit thereof is more preferably 90% by weight, still more preferably 80% by weight.

The polystyrene resin constituting the mixed resin of a polystyrene resin and a polyester elastomer (herein, also referred to as a mixed resin (b)) may be the same as or different from the above polystyrene resin constituting the interlayer. The polystyrene resin constituting the mixed resin (b) is preferably softer than the polystyrene resin constituting the interlayer.

When the polystyrene resin constituting the mixed resin (b) is a styrene-conjugated diene copolymer, the conjugated diene content in 100% by weight of the styrene-conjugated diene copolymer is preferably less than 50% by weight. When the conjugated diene content is 50% by weight or more, separation may occur from the solvent seal portion during attachment of the heat shrinkable multilayer film to a container. In addition, delamination of the heat shrinkable multilayer film may occur when the overlapping portion is scratched after attaching the film to a container or when the film is torn along the perforation.

In the mixed resin (b), the lower limit of the amount of the polystyrene resin is preferably 10% by weight and the upper limit thereof is preferably 95% by weight. When the amount of the polystyrene resin is less than 10% by weight, the heat shrinkable multilayer film may whiten at a fold when folded hard (whitening phenomenon), which may impair the appearance. When the amount of the polystyrene resin is more than 95% by weight, the interlaminar strength of the heat shrinkable multilayer film may be reduced. In addition, delamination of the heat shrinkable multilayer film may occur when the overlapping portion is scratched after attaching the film to a container or when the film is torn along the perforation. The lower limit of the amount of the polystyrene resin is more preferably 20% by weight, still more preferably 25% by weight, and the upper limit thereof is more preferably 90% by weight, still more preferably 85% by weight.

The polyester elastomer constituting the mixed resin (b) is preferably the same as the above polyester elastomer constituting the adhesive layers.

The polyester elastomer constituting the mixed resin (b) preferably has a melting point of 120° C. to 200° C. A polyester elastomer having a melting point of lower than 120° C. may reduce the heat resistance of the heat shrinkable multilayer film, which may cause separation to occur from the solvent seal portion during attachment of the heat shrinkable multilayer film to a container. A polyester elastomer having a melting point of higher than 200° C. may not provide sufficient adhesive strength. The lower limit of the melting point is more preferably 130° C. and the upper limit thereof is more preferably 190° C.

The melting point of the polyester elastomer constituting the mixed resin (b) depends on, for example, the copolymerization ratio between the aromatic polyester as a hard segment and the polyalkylene ether glycol as a soft segment, the structure, and the like. The melting point of the polyester elastomer particularly tends to depend on the copolymerization amount of the polyalkylene ether glycol. A larger copolymerization amount of the polyalkylene ether glycol leads to a lower melting point, while a smaller copolymerization amount of the polyalkylene ether glycol leads to a higher melting point.

In the mixed resin (b), the lower limit of the amount of the polyester elastomer is preferably 5% by weight and the upper limit thereof is preferably 80% by weight. When the amount of the polyester elastomer is less than 5% by weight, the interlaminar strength of the heat shrinkable multilayer film may be reduced. In addition, delamination of the heat shrinkable multilayer film may occur when the overlapping portion is scratched after attaching the film to a container or when the film is torn along the perforation. When the amount of the polyester elastomer is more than 80% by weight, the heat shrinkable multilayer film may whiten at a fold when folded hard (whitening phenomenon), which may impair the appearance. The lower limit of the amount of the polyester elastomer is more preferably 10% by weight, still more preferably 15% by weight, and the upper limit thereof is more preferably 75% by weight, still more preferably 70% by weight.

The adhesive layers may contain an antioxidant, a thermal stabilizer, a lubricant, an antistatic agent, and the like, if necessary.

The lower limit of the overall thickness of the heat shrinkable multilayer film of the present invention is preferably 20 μm and the upper limit thereof is preferably 80 μm. The heat shrinkable multilayer film having an overall thickness within the above range is economical and easy to handle.

Regarding the thickness ratio of the layers of the heat shrinkable multilayer film of the present invention, the front layer/interlayer/back layer ratio is preferably within the range of 1/4/1 to 1/12/1. In other words, the ratio of the total thickness of the front layer and the back layer to the thickness of the interlayer ((thickness of front layer+thickness of back layer)/thickness of interlayer) is preferably 0.17 to 0.50. Also when the heat shrinkable multilayer film of the present invention includes the adhesive layers, the front and back layers and the interlayer satisfying the above range can reduce loosening of the heat shrinkable label after attachment of the label.

For example, when the heat shrinkable multilayer film of the present invention has an overall thickness of 40 μm, the lower limit of the thickness of the interlayer is preferably 24 μm and the upper limit thereof is preferably 34.4 μm. An interlayer having a thickness of less than 24 μm may reduce the ease of cutting of the heat shrinkable multilayer film along the perforation. An interlayer having a thickness of more than 34.4 μm may reduce the heat resistance of the heat shrinkable multilayer film. The lower limit of the thickness of the interlayer is more preferably 26 μm and the upper limit thereof is more preferably 33 μm.

When the heat shrinkable multilayer film of the present invention has an overall thickness of 40 μm, the lower limit of the thickness of the front and back layers (the thickness of each of the front layer and the back layer) is preferably 2.8 μm, and the upper limit thereof is preferably 8 μm. Front and back layers having a thickness of less than 2.8 μm may reduce the solvent resistance or heat resistance of the heat shrinkable multilayer film. Front and back layers having a thickness of more than 8 μm may reduce the ease of cutting of the heat shrinkable multilayer film along the perforation. The lower limit of the thickness of the front and back layers is more preferably 4 μm and the upper limit thereof is more preferably 7 μm.

When the heat shrinkable multilayer film of the present invention has an overall thickness of 40 μm and includes the adhesive layers, the lower limit of the thickness of each adhesive layer is preferably 0.2 μm and the upper limit thereof is preferably 2 μm. An adhesive layer having a thickness of less than 0.2 μm may make stable film production impossible. An adhesive layer having a thickness of more than 2 μm may reduce the heat shrinkage characteristics or optical characteristics of the heat shrinkable multilayer film. The lower limit of the thickness of each adhesive layer is more preferably 0.5 μm and the upper limit thereof is more preferably 1.5 μm.

In the heat shrinkable multilayer film of the present invention, the shrinkage ratio in the main shrinkage direction at 70° C. in 10 seconds is preferably 15 to 50%, more preferably 20 to 47%, still more preferably 25 to 45%, particularly preferably 30 to 45%. The shrinkage ratio in the main shrinkage direction at 80° C. in 10 seconds is preferably 50 to 70%, more preferably 55 to 69%, still more preferably 58 to 68%, particularly preferably 60 to 67%. The shrinkage ratio in the main shrinkage direction in boiling water in 10 seconds is preferably 65 to 85%, more preferably 70 to 83%, still more preferably 75 to 82%. The heat shrinkable multilayer film having such shrinkage ratios can impart excellent shrink finish quality in dry heat shrinking.

The heat shrinkable multilayer film of the present invention preferably has an interlaminar strength (adhesive strength) in the direction (MD) perpendicular to the main shrinkage direction of 0.8 to 2.0 N/10 mm. When the interlaminar strength is less than 0.8 N/10 mm, delamination may occur in covering a container with the heat shrinkable label. The lower limit of the interlaminar strength is more preferably 0.9 N/10 mm, still more preferably 1.0 N/10 mm.

The heat shrinkable multilayer film of the present invention preferably has an interlaminar strength in the main shrinkage direction (TD) of 0.5 to 2.0 N/10 mm. When the interlaminar strength is less than 0.5 N/10 mm, delamination due to friction may occur during transportation of labelled containers in a cardboard box. The lower limit of the interlaminar strength is more preferably 0.65 N/10 mm, still more preferably 0.8 N/10 mm.

In the heat shrinkable multilayer film of the present invention, the interlaminar strength in the MD is preferably higher than the interlaminar strength in the TD. Attaching the heat shrinkable label to a container using a labeler (a device to cover a container with a heat shrinkable label) tends to apply force in the MD. Thus, high interlaminar strength in the MD allows suitable attachment of the heat shrinkable label to a container.

The interlaminar strength can be measured by measuring the interlaminar strength of a measurement sample using a peel tester when one layer of the sample is peeled from another layer in the 180° direction in the MD or TD.

In the heat shrinkable multilayer film of the present invention, the lower limit of the dimensional change in the TD represented by the equation (1) as measured by thermomechanical analysis (TMA) is −55 μm, and the upper limit thereof is −1000 μm.

The dimensional change means the difference between the dimension in the TD at 20° C. and the dimension in the TD at 60° C., and can be calculated by the following equation.

Dimensional change=dimension in *TD* at 20° C.−dimension in *TD* at 60° C. (1)

The expression "dimensional change is −55 to −1000 μm" means that the heat shrinkable multilayer film is shrunk.

The heat shrinkable multilayer film having a dimensional change of −55 μm or more as measured by TMA can reduce the gap between the container and the label, thus reducing loosening of the label. The heat shrinkable multilayer film having a dimensional change of −1000 μm or less as measured by TMA can prevent crushing of the container after dry heat drying.

The dimensional change as measured by TMA is preferably −55 to −800 μm, more preferably −55 to −600 μm.

Specifically, the dimensional change can be measured by the following method.

The heat shrinkable multilayer film is cut to a size of a measurement reference length of 16 mm×a width of 4.7 mm such that the TD (main shrinkage direction) corresponds to the longitudinal direction, whereby a sample is prepared. The temperature of the obtained sample is increased from 30° C. to 60° C. at a temperature increase rate of 5° C./rain with a load of 0.1 N and then cooled from 60° C. to 10° C. at a temperature decrease rate of 5° C./min using a thermomechanical analyzer (produced by TA Instruments, TMA Q400). The dimensional change can be calculated based on the length of the sample at 60° C. and the length of the sample at 20° C.

Alternatively, the dimensional change can be determined as follows. A sample having any length is prepared such that the sample has a measurement site with a measurement reference length of 16 mm. The temperature of the sample is increased from 30° C. to 60° C. at a temperature increase rate of 5° C./min with a load of 0.1 N and then cooled from 60° C. to 10° C. at a temperature decrease rate of 5° C./min. The dimensional change can be calculated based on the difference between a dimensional change from the measurement reference length at the measurement site at 60° C. and a dimensional change from the measurement reference length at the measurement site at 20° C.

The heat shrinkable multilayer film of the present invention preferably has a proportion of the dimensional change to the measurement reference length (dimensional change/measurement reference length×100) of 0.34 to 6.9%, more preferably 0.34 to 5.0%, still more preferably 0.34 to 3.8%.

The above dimensional change as measured by TMA can be achieved by adjusting the mixing proportion of raw material resins, the layer ratio of layers, and the film formation conditions for layers (e.g., stretching temperature and stretching ratio), for example.

The heat shrinkable multilayer film of the present invention may be produced by any method, and is preferably produced by simultaneously forming all the layers by a co-extrusion method. When the co-extrusion method is co-extrusion using a T-die, the layers may be stacked by a feed block technique, a multi-manifold technique, or a combination thereof.

Specifically, for example, the heat shrinkable multilayer film of the present invention may be produced by feeding the raw materials to constitute the front and back layers, the interlayer, and the adhesive layers into extruders, extruding them into a sheet through a multilayer die, and cooling and solidifying the sheet on a take-up roll, followed by uniaxial or biaxial stretching.

The stretching can be performed by, for example, a roll stretching method, a tenter stretching method, or a combination thereof. The stretching temperature is adjusted according to the softening temperatures of the resins constituting the film or the shrinkage properties required of the heat shrinkable multilayer film. The lower limit of the stretching temperature is preferably 65° C. and the upper limit thereof is preferably 120° C. The lower limit is more preferably 70° C. and the upper limit is more preferably 115° C. The stretching ratio in the main shrinkage direction is changed according to the resins constituting the film, the stretching means, the stretching temperature, and the like. The stretching ratio is preferably 3 times or more, more preferably 4 times or more and is preferably 7 times or less, more preferably 6 times or less. With such stretching temperature and stretching ratio, the film can achieve excellent thickness precision, and also can prevent the front or back layer on the inner side from remaining alone on the container due to delamination in tearing the film along the perforation.

The heat shrinkable multilayer film of the present invention can be used in any application. The heat shrinkable multilayer film of the present invention can prevent wrinkles and loosening after attachment when attached to a container as a heat shrinkable label for dry heat shrinking. Thus, for example, the heat shrinkable multilayer film can be suitably used as a base film for heat shrinkable labels to be attached to toiletry containers with high design quality, especially containers of body care products, skin care products, hair care products, bath additives, and the like. A heat shrinkable label including the heat shrinkable multilayer film of the present invention is also encompassed by the present invention.

Advantageous Effects of Invention

The present invention can provide a heat shrinkable multilayer film that can prevent wrinkles or loosening after attachment when the film is attached to a container as a heat shrinkable label for dry heat shrinking, and a heat shrinkable label including the heat shrinkable multilayer film as a base film.

DESCRIPTION OF EMBODIMENTS

The following will describe embodiments of the present invention in detail referring to examples, but the present invention should not be limited to these examples.

The following materials were used in examples and comparative examples.

(Polyester Resin)

Polyester resin A: polyester resin (glass transition temperature 69° C.) containing 100 mol % of a component derived from terephthalic acid as a dicarboxylic acid component and containing 65 mol % of a component derived from ethylene glycol, 20 mol % of a component derived from diethylene glycol, and 15 mol % of a component derived from 1,4-cyclohexanedimethanol as diol components Polyester resin B: polyester resin (melting point 223° C.) containing 100 mol % of terephthalic acid as a dicarboxylic acid component and containing 100 mol % of a component derived from 1,4-butanediol as a diol component Polyester resin C: polyester resin (melting point 170° C.) containing 70 mol % of terephthalic acid and 30 mol % of isophthalic acid as dicarboxylic acid components and containing 100 mol % of a component derived from 1,4-butanediol as a diol component (Polystyrene Resin)

Polystyrene resin A: styrene-butadiene copolymer (styrene 81.3% by weight, butadiene 18.7% by weight, Vicat softening temperature 81° C.)

Polystyrene resin B: styrene-butadiene copolymer (styrene 79% by weight, butadiene 21% by weight, Vicat softening temperature 59° C.)

Polystyrene resin C: styrene-butadiene copolymer (styrene 77.7% by weight, butadiene 22.3% by weight, Vicat softening temperature 71° C.)

Polystyrene resin D: styrene-butadiene copolymer (styrene 72% by weight, butadiene 28% by weight, Vicat softening temperature 76° C.)

Polystyrene resin E: styrene-butadiene copolymer (styrene 80% by weight, butadiene 20% by weight, Vicat softening temperature 74° C.) Polystyrene resin F: styrene-butadiene copolymer (styrene 82% by weight, butadiene 18% by weight, Vicat softening temperature 75° C.)

Polystyrene resin G: styrene-butadiene copolymer (styrene 82% by weight, butadiene 18% by weight, Vicat softening temperature 76° C.)

(Polyester Elastomer)

Polyester elastomer A: non-modified polyester-polyether block copolymer containing a polyester as a hard segment and a polyether as a soft segment (produced by Du Pont-Toray Co., Ltd., Hytrel 2521, durometer hardness 55)

Polyester elastomer B: modified polyester-polyether block copolymer elastomer containing a polyester as a hard segment and a polyether as a soft segment (produced by Mitsubishi Chemical Corporation, PRIMALLOY AP, durometer hardness 40)

(Polystyrene Elastomer)

Polystyrene elastomer: styrene-butadiene block copolymer (styrene 40% by weight, butadiene 60% by weight, Vicat softening temperature 76° C.)

Example 1

Polyester resin A was used as a resin to constitute the front and back layers.

A mixed resin containing 50% by weight of polystyrene resin A and 50% by weight of polystyrene resin B was used as a resin to constitute the interlayer.

A mixed resin containing 59% by weight of polyester resin A, 10% by weight of polyester resin C, and 31% by weight of polystyrene resin D was used as a resin to constitute the adhesive layers.

These resins were fed into extruders having a barrel temperature of 160° C. to 250° C., extruded into a five-layer sheet through a multilayer die at 250° C., and cooled and solidified on a take-up roll at 30° C. Subsequently, the sheet was stretched at stretching ratio of 6 times in a tenter stretching machine with a preheating zone set at 105° C., a stretching zone set at 90° C., and a heat setting zone set at 85° C., and then wound with a winder. Thus, a heat shrinkable multilayer film was obtained in which the direction perpendicular to the main shrinkage direction was the MD and the main shrinkage direction was the TD.

The obtained heat shrinkable multilayer film had a total thickness of 50 μm and had a five-layer structure (front or back layer (7 μm)/adhesive layer (1 μm)/interlayer (34 μm)/adhesive layer (1 μm)/front or back layer (7 μm)).

Example 2

Polyester resin A was used as a resin to constitute the front and back layers.

A mixed resin containing 30% by weight of polystyrene resin A and 70% by weight of polystyrene resin C was used as a resin to constitute the interlayer.

A mixed resin containing 65% by weight of polyester elastomer A and 35% by weight of polystyrene resin D was used as a resin to constitute the adhesive layers.

These resins were fed into extruders having a barrel temperature of 160° C. to 250° C., extruded into a five-layer sheet through a multilayer die at 250° C., and cooled and solidified on a take-up roll at 30° C. Subsequently, the sheet was stretched at stretching ratio of 6 times in a tenter stretching machine with a preheating zone set at 105° C., a stretching zone set at 90° C., and a heat setting zone set at 85° C., and then wound with a winder. Thus, a heat shrinkable multilayer film was obtained in which the direction perpendicular to the main shrinkage direction was the MD and the main shrinkage direction was the TD.

The obtained heat shrinkable multilayer film had a total thickness of 50 μm and had a five-layer structure (front or back layer (7 μm)/adhesive layer (1 μm)/interlayer (34 μm)/adhesive layer (1 μm)/front or back layer (7 μm)).

Example 3

A mixed resin containing 80% by weight of polyester resin A and 20% by weight of polyester resin B was used as a resin to constitute the front and back layers.

A mixed resin containing 32% by weight of polystyrene resin D and 68% by weight of polystyrene resin E was used as a resin to constitute the interlayer.

Polyester elastomer B was used as a resin to constitute the adhesive layers.

These resins were fed into extruders having a barrel temperature of 160° C. to 250° C., extruded into a five-layer sheet through a multilayer die at 250° C., and cooled and solidified on a take-up roll at 30° C. Subsequently, the sheet was stretched at stretching ratio of 6 times in a tenter stretching machine with a preheating zone set at 105° C., a stretching zone set at 90° C., and a heat setting zone set at 85° C., and then wound with a winder. Thus, a heat shrinkable multilayer film was obtained in which the direction perpendicular to the main shrinkage direction was the MD and the main shrinkage direction was the TD.

The obtained heat shrinkable multilayer film had a total thickness of 40 μm and had a five-layer structure (front or back layer (5.7 μm)/adhesive layer (0.7 μm)/interlayer (27.2 μm)/adhesive layer (0.7 μm)/front or back layer (5.7 μm)).

Example 4

Polyester resin A was used as a resin to constitute the front and back layers.

A mixed resin containing 40% by weight of polystyrene resin D, 54.3% by weight of polystyrene resin G, and 5.7% by weight of the polystyrene elastomer was used as a resin to constitute the interlayer.

Polyester elastomer B was used as a resin to constitute the adhesive layers.

These resins were fed into extruders having a barrel temperature of 160° C. to 250° C., extruded into a five-layer sheet through a multilayer die at 250° C., and cooled and solidified on a take-up roll at 30° C. Subsequently, the sheet was stretched at stretching ratio of 6 times in a tenter stretching machine with a preheating zone set at 105° C., a stretching zone set at 90° C., and a heat setting zone set at 85° C., and then wound with a winder. Thus, a heat shrinkable multilayer film was obtained in which the direction perpendicular to the main shrinkage direction was the MD and the main shrinkage direction was the TD.

The obtained heat shrinkable multilayer film had a total thickness of 35 μm and had a five-layer structure (front or back layer (3.8 μm)/adhesive layer (0.5 μm)/interlayer (26.4 μm)/adhesive layer (0.5 μm)/front or back layer (3.8 μm)).

Example 5

Polyester resin A was used as a resin to constitute the front and back layers.

A mixed resin containing 30% by weight of polystyrene resin A and 70% by weight of polystyrene resin C was used as a resin to constitute the interlayer.

A mixed resin containing 30% by weight of polyester elastomer A and 70% by weight of polystyrene resin D was used as a resin to constitute the adhesive layers.

These resins were fed into extruders having a barrel temperature of 160° C. to 250° C., extruded into a five-layer sheet through a multilayer die at 250° C., and cooled and solidified on a take-up roll at 30° C. Subsequently, the sheet was stretched at stretching ratio of 6 times in a tenter stretching machine with a preheating zone set at 105° C., a stretching zone set at 90° C., and a heat setting zone set at 85° C., and then wound with a winder. Thus, a heat shrinkable multilayer film was obtained in which the direction perpendicular to the main shrinkage direction was the MD and the main shrinkage direction was the TD.

The obtained heat shrinkable multilayer film had a total thickness of 40 μm and had a five-layer structure (front or back layer (5.7 μm)/adhesive layer (0.7 μm)/interlayer (27.2 μm)/adhesive layer (0.7 μm)/front or back layer (5.7 μm)).

Example 6

Polyester resin A was used as a resin to constitute the front and back layers.

A mixed resin containing 30% by weight of polystyrene resin A and 70% by weight of polystyrene resin F was used as a resin to constitute the interlayer.

A mixed resin containing 60% by weight of polyester elastomer B and 40% by weight of polystyrene resin D was used as a resin to constitute the adhesive layers.

These resins were fed into extruders having a barrel temperature of 160° C. to 250° C., extruded into a five-layer sheet through a multilayer die at 250° C., and cooled and solidified on a take-up roll at 30° C. Subsequently, the sheet was stretched at stretching ratio of 6 times in a tenter stretching machine with a preheating zone set at 105° C., a stretching zone set at 90° C., and a heat setting zone set at 85° C., and then wound with a winder. Thus, a heat shrinkable multilayer film was obtained in which the direction perpendicular to the main shrinkage direction was the MD and the main shrinkage direction was the TD.

The obtained heat shrinkable multilayer film had a total thickness of 40 μm and had a five-layer structure (front or back layer (5.7 μm)/adhesive layer (0.7 μm)/interlayer (27.2 μm)/adhesive layer (0.7 μm)/front or back layer (5.7 μm)).

Example 7

Polyester resin A was used as a resin to constitute the front and back layers.

A mixed resin containing 30% by weight of polystyrene resin A and 70% by weight of polystyrene resin F was used as a resin to constitute the interlayer.

Polyester elastomer A was used as a resin to constitute the adhesive layers.

These resins were fed into extruders having a barrel temperature of 160° C. to 250° C., extruded into a five-layer sheet through a multilayer die at 250° C., and cooled and solidified on a take-up roll at 30° C. Subsequently, the sheet was stretched at stretching ratio of 6 times in a tenter stretching machine with a preheating zone set at 105° C., a stretching zone set at 90° C., and a heat setting zone set at 85° C., and then wound with a winder. Thus, a heat shrinkable multilayer film was obtained in which the direction perpendicular to the main shrinkage direction was the MD and the main shrinkage direction was the TD.

The obtained heat shrinkable multilayer film had a total thickness of 35 μm and had a five-layer structure (front or back layer (3.8 µm)/adhesive layer (0.5 µm)/interlayer (26.4 µm)/adhesive layer (0.5 µm)/front or back layer (3.8 µm)).

Example 8

Polyester resin A was used as a resin to constitute the front and back layers.

A mixed resin containing 40% by weight of polystyrene resin D, 54.3% by weight of polystyrene resin G, and 5.7% by weight of the polystyrene elastomer was used as a resin to constitute the interlayer.

Polyester elastomer B was used as a resin to constitute the adhesive layers.

These resins were fed into extruders having a barrel temperature of 160° C. to 250° C., extruded into a five-layer sheet through a multilayer die at 250° C., and cooled and solidified on a take-up roll at 30° C. Subsequently, the sheet was stretched at stretching ratio of 6 times in a tenter stretching machine with a preheating zone set at 105° C., a stretching zone set at 90° C., and a heat setting zone set at 85° C., and then wound with a winder. Thus, a heat shrinkable multilayer film was obtained in which the direction perpendicular to the main shrinkage direction was the MD and the main shrinkage direction was the TD.

The obtained heat shrinkable multilayer film had a total thickness of 40 µm and had a five-layer structure (front or back layer (5 µm)/adhesive layer (0.5 µm)/interlayer (29 µm)/adhesive layer (0.5 µm)/front or back layer (5 µm)).

Example 9

Polyester resin A was used as a resin to constitute the front and back layers.

Polystyrene resin E was used as a resin to constitute the interlayer.

Polyester elastomer A was used as a resin to constitute the adhesive layers.

These resins were fed into extruders having a barrel temperature of 160° C. to 250° C., extruded into a five-layer sheet through a multilayer die at 250° C., and cooled and solidified on a take-up roll at 30° C. Subsequently, the sheet was stretched at stretching ratio of 6 times in a tenter stretching machine with a preheating zone set at 105° C., a stretching zone set at 90° C., and a heat setting zone set at 85° C., and then wound with a winder. Thus, a heat shrinkable multilayer film was obtained in which the direction perpendicular to the main shrinkage direction was the MD and the main shrinkage direction was the TD.

The obtained heat shrinkable multilayer film had a total thickness of 40 µm and had a five-layer structure (front or back layer (5.7 µm)/adhesive layer (0.7 µm)/interlayer (27.2 µm)/adhesive layer (0.7 µm)/front or back layer (5.7 µm)).

Comparative Example 1

Polyester resin A was used as a resin to constitute the front and back layers.

A mixed resin containing 40% by weight of polystyrene resin D, 54.3% by weight of polystyrene resin G, and 5.7% by weight of the polystyrene elastomer was used as a resin to constitute the interlayer.

Polyester elastomer B was used as a resin to constitute the adhesive layers.

These resins were fed into extruders having a barrel temperature of 160° C. to 250° C., extruded into a five-layer sheet through a multilayer die at 250° C., and cooled and solidified on a take-up roll at 30° C. Subsequently, the sheet was stretched at stretching ratio of 6 times in a tenter stretching machine with a preheating zone set at 105° C., a stretching zone set at 90° C., and a heat setting zone set at 85° C., and then wound with a winder. Thus, a heat shrinkable multilayer film was obtained in which the direction perpendicular to the main shrinkage direction was the MD and the main shrinkage direction was the TD.

The obtained heat shrinkable multilayer film had a total thickness of 25 µm and had a five-layer structure (front or back layer (5 µm)/adhesive layer (0.5 µm)/interlayer (14 µm)/adhesive layer (0.5 µm)/front or back layer (5 µm)).

(Evaluation)

The heat shrinkable multilayer films obtained in the examples and the comparative examples were evaluated as follows. Table 1 shows the results.

(1) Thermomechanical Analysis (TMA)

Each of the heat shrinkable multilayer films obtained in Examples 1 to 9 and Comparative Example 1 was cut to 26 mm in length×4.7 mm in width such that the TD (main shrinkage direction) corresponded to the longitudinal direction, whereby a sample having a measurement site with a measurement reference length of 16 mm was prepared.

The temperature of the obtained sample was increased from 30° C. to 60° C. at a temperature increase rate of 5° C./min with a load of 0.1 N using a thermomechanical analyzer (produced by TA Instruments, TMA Q400).

The temperature was then cooled from 60° C. to 10° C. at a temperature decrease rate of 5° C./min to measure the difference between a dimensional change from the measurement reference length at the measurement site at 60° C. and a dimensional change from the measurement reference length at the measurement site at 20° C. The dimensional change was calculated by the following equation.

Dimensional change (µm)=dimensional change (µm) from measurement reference length at 20° C.−dimensional change (µm) from measurement reference length at 60° C.

(2) Displacement Width

Labels having a lay flat width of 132 mm and a length of 90 mm were produced using the heat shrinkable multilayer films obtained in Examples 1 to 9 and Comparative Example 1.

A covering type shrink tunnel K-1000 (produced by Kyowa Denki Co., Ltd.) was set at a tunnel temperature of 90° C., an air flow of 20 Hz, and a belt speed of 25 Hz (transit time: 25 seconds) and used as tunnel 1.

Separately, a covering type shrink tunnel K-100 (produced by Kyowa Denki Co., Ltd.) was set at a tunnel temperature of 100° C., an air flow of 40 Hz, a belt speed of 25 Hz (transit time: 25 seconds) and used as tunnel 2.

Subsequently, each obtained label was attached to a spray bottle (Kabi Killer® spray bottle, capacity: 400 mL, width: 102 mm, depth: 57 mm, height: 164 mm), and passed through tunnel 1, then a room temperature atmosphere for 7 seconds, and then tunnel 2. The label was thus shrunk, and then left to stand for 24 hours.

A load of up to 10 N was applied to the label of the obtained labelled container in the circumferential direction, and the displacement width in the circumferential direction was measured. A displacement width of 0 to 10 mm indicates that the loosening of the film can be sufficiently reduced.

TABLE 1

| | | | | Example 1 | Example 2 | Example 3 | Example 4 | Example 5 | Example 6 | Example 7 | Example 8 | Example 9 | Comparative Example 1 |
|---|---|---|---|---|---|---|---|---|---|---|---|---|---|
| Heat shrinkable multilayer film | Front and back layers | Constituent resin (% by weight) | Polyester resin A | 100 | 100 | 80 | 100 | 100 | 100 | 100 | 100 | 100 | 100 |
| | | | Polyester resin B | — | — | 20 | — | — | — | — | — | — | — |
| | | | Thickness (μm) | 7 | 7 | 5.7 | 3.8 | 5.7 | 5.7 | 3.8 | 5 | 5.7 | 5 |
| | Interlayer | Constituent resin (% by weight) | Polystyrene resin A (Vicat softening temperature: 81° C.) | 50 | 30 | — | — | 30 | 30 | 30 | — | — | — |
| | | | Polystyrene resin B (Vicat softening temperature: 59° C.) | 50 | — | — | — | — | — | — | — | — | — |
| | | | Polystyrene resin C (Vicat softening temperature: 71° C.) | — | 70 | — | — | 70 | — | — | — | — | — |
| | | | Polystyrene resin D (Vicat softening temperature: 76° C.) | — | — | 32 | 40 | — | — | — | 40 | — | 40 |
| | | | Polystyrene resin E (Vicat softening temperature: 74° C.) | — | — | 68 | — | — | — | — | — | 100 | — |
| | | | Polystyrene resin F (Vicat softening temperature: 75° C.) | — | — | — | — | — | 70 | 70 | — | — | — |
| | | | Polystyrene resin G (Vicat softening temperature: 76° C.) | — | — | — | 54.3 | — | — | — | 54.3 | — | 54.3 |
| | | | Polystyrene elastomer (Vicat softening temperature: 76° C.) | — | — | — | 5.7 | — | — | — | 5.7 | — | 5.7 |
| | | | Thickness (μm) | 34 | 34 | 27.2 | 26.4 | 27.2 | 27.2 | 26.4 | 29 | 27.2 | 14 |
| | Adhesive layer | Constituent resin (% by weight) | Polyester resin A | 59 | — | — | — | — | — | — | — | — | — |
| | | | Polyester resin C | 10 | — | — | — | — | — | — | — | — | — |
| | | | Polyester elastomer A | — | 65 | — | — | 30 | — | 100 | — | 100 | — |
| | | | Polyester elastomer B | — | — | 100 | 100 | — | 60 | — | 100 | — | 100 |
| | | | Polystyrene resin D | 31 | 35 | — | — | 70 | 40 | — | — | — | — |
| | | | Thickness (μm) | 1 | 1 | 0.7 | 0.5 | 0.7 | 0.7 | 0.5 | 0.5 | 0.7 | 0.5 |
| | | | Total Thickness (μm) | 50 | 50 | 40 | 35 | 40 | 40 | 35 | 40 | 40 | 25 |
| | | | (Front layer thickness + back layer thickness)/interlayer thickness | 0.412 | 0.412 | 0.419 | 0.288 | 0.419 | 0.419 | 0.288 | 0.345 | 0.419 | 0.714 |
| Evaluation | | | Dimentional change (μm) | −588 | −80 | −237 | −61 | −118 | −148 | −80 | −106 | −189 | −52 |
| | | | Displacement width (mm) | 4 | 5 | 6 | 6 | 6 | 7 | 8 | 8 | 8 | 12 |

INDUSTRIAL APPLICABILITY

The present invention can provide a heat shrinkable multilayer film that can prevent wrinkles or loosening after attachment when the film is attached to a container as a heat shrinkable label for dry heat shrinking, and a heat shrinkable label including the heat shrinkable multilayer film as a base film.

The invention claimed is:

1. A heat shrinkable multilayer film comprising:
front and back layers each containing a polyester resin;
an interlayer containing a polystyrene resin;
a first adhesive layer between the front layer and the interlayer; and
a second adhesive layer between the back layer and the interlayer,
wherein the interlayer contains a polystyrene resin (A) having a Vicat softening temperature of 80° C. or higher in an amount of 10 to 50% by weight and a polystyrene resin (B) having a Vicat softening temperature of lower than 80° C. in an amount of 50 to 90% by weight,
all of the polystyrene resin constituting the interlayer is an aromatic vinyl hydrocarbon-conjugated diene copolymer,
each of the first and the second adhesive layers consists of at least one polyester elastomer,
the heat shrinkable multilayer film has a dimensional change in a main shrinkage direction (TD) represented by an equation (1) of −55 to −1000 μm as measured, using a sample of the heat shrinkable multilayer film cut to a measurement reference length of 16 mm, by thermomechanical analysis (TMA) in which the temperature of the heat shrinkable multilayer film under a load of 0.10 N is increased from 30° C. to 60° C. at a temperature increase rate of 5° C./min and then cooled from 60° C. to 10° C. at a temperature decrease rate of 5° C./min, and
a proportion of the dimensional change to the measurement reference length (the dimensional change/the measurement reference length×100) of 0.34 to 6.9%,
wherein the equation (1) is: Dimensional change=dimension in TD at 20° C. −dimension in TD at 60° C. (1).

2. The heat shrinkable multilayer film according to claim 1,
wherein the polystyrene resin (A) and the polystyrene resin (B) have a difference in Vicat softening temperature of 10° C. to 25° C.

3. The heat shrinkable multilayer film according to claim 1,
wherein a ratio of a total thickness of the front and back layers to a thickness of the interlayer (total thickness of front and back layers/thickness of interlayer) is 0.17 to 0.50.

4. A heat shrinkable label comprising
the heat shrinkable multilayer film according to claim 1.

* * * * *